US012764164B2

(12) United States Patent
Giralte

(10) Patent No.: US 12,764,164 B2
(45) Date of Patent: Oct. 13, 2026

(54) SYSTEMS, METHODS, AND DEVICES FOR SECURITY ENHANCEMENTS IN CLOUD COMPUTING ENVIRONMENTS

(71) Applicant: Salesforce, Inc., San Francisco, CA (US)

(72) Inventor: Luis Campo Giralte, Dublin (IE)

(73) Assignee: Salesforce, Inc., San Francisco, CA (US)

( * ) Notice: Subject to any disclaimer, the term of this patent is extended or adjusted under 35 U.S.C. 154(b) by 231 days.

(21) Appl. No.: 18/159,497

(22) Filed: Jan. 25, 2023

(65) Prior Publication Data

US 2024/0250991 A1 Jul. 25, 2024

(51) Int. Cl.

| | |
|---|---|
| ***H04L 9/40*** | (2022.01) |
| ***H04L 61/4511*** | (2022.01) |
| ***H04L 61/58*** | (2022.01) |
| ***H04L 67/1097*** | (2022.01) |

(52) U.S. Cl.

CPC .......... *H04L 63/20* (2013.01); *H04L 61/4511* (2022.05); *H04L 61/58* (2022.05); *H04L 63/0218* (2013.01); *H04L 67/1097* (2013.01)

(58) Field of Classification Search

CPC . H04L 63/20; H04L 63/0218; H04L 67/1097; H04L 61/4511; H04L 61/58

See application file for complete search history.

(56) References Cited

U.S. PATENT DOCUMENTS

| | | | | |
|---|---|---|---|---|
| 8,843,997 | B1 * | 9/2014 | Hare | H04L 63/0815 709/200 |
| 10,764,244 | B1 * | 9/2020 | Mestery | H04L 63/0281 |
| 10,965,547 | B1 * | 3/2021 | Esposito | H04L 67/10 |

(Continued)

FOREIGN PATENT DOCUMENTS

| | | | | |
|---|---|---|---|---|
| CN | 114465827 A * | 5/2022 | | |
| KR | 101911913 B1 * | 1/2019 | .......... | H04L 41/145 |

OTHER PUBLICATIONS

Flittner, M., Scheuermann, J., Bauer, R. "ChainGuard: Controller-independent verification of service function chaining in cloud commputing". IEEE. 2017 IEEE Conference on Network Function Virtualization and Software Defined Networks (NFV-SDN). Nov. 6-8, 2017. (Year: 2017).*

Pattaranantakul, M., Song, Q., Tian, Y., Wang, L., Zhang, Z., Meddahi, A. "On Achieving Trustworthy Service Function Chaining". IEEE. IEEE Transactions on Network and Service Management. vol. 18, Issue 3, p. 3140-3153. May 17, 2021. (Year: 2021).*

* cited by examiner

*Primary Examiner* — Pramila Parthasarathy
(74) *Attorney, Agent, or Firm* — Polygon IP, LLP

(57) ABSTRACT

Systems, methods, and devices are disclosed herein that provide security for requests sent to services in service meshes. A computing platform may be implemented using a server system. The computing platform is configurable to cause receiving a request from a service in a cloud-based computing environment, and identifying a chain of trust embedded in a portion of the request, the chain of trust being generated by one or more security entities in the cloud-based computing environment, the chain of trust identifying results of one or more security verification operations performed on the request. The computing platform is further configurable to cause determining if the chain of trust is a valid chain of trust based, at least in part, on one or more security policies, and sending the request to another entity in the cloud-based computing environment in response to determining the chain of trust is a valid chain of trust.

15 Claims, 9 Drawing Sheets

(56) References Cited

U.S. PATENT DOCUMENTS 11,057,393 B2 * 7/2021 Coffing .................. G06Q 20/40
11,563,636 B1 * 1/2023 Kairali .................. H04L 67/562
2007/0261112 A1 * 11/2007 Todd .................. H04L 63/1483 726/2
2016/0072816 A1 * 3/2016 Makhervaks ......... H04L 63/101 726/13
2016/0099963 A1 * 4/2016 Mahaffey ............. H04L 63/166 726/25
2017/0339130 A1 * 11/2017 Reddy ................. H04L 63/0823
2018/0367621 A1 * 12/2018 Mullender ............. H04L 67/02
2019/0273746 A1 * 9/2019 Coffing .................. G06Q 20/40
2020/0120168 A1 * 4/2020 Nainar .................... H04L 45/30
2020/0127980 A1 * 4/2020 Smith ................. H04L 63/0428
2020/0162380 A1 * 5/2020 Pilkington .............. H04L 45/02
2020/0177549 A1 * 6/2020 Barton ................ H04L 41/5041
2021/0226899 A1 * 7/2021 Karunakaran ...... H04L 41/0803
2021/0243161 A1 * 8/2021 Schibuk .............. H04L 63/1416
2021/0328886 A1 * 10/2021 Guim Bernat ........ G06F 9/5072
2021/0328971 A1 * 10/2021 Bandi ...................... G06F 21/53
2021/0385194 A1 * 12/2021 Kulkarni ............... H04L 63/104
2022/0053000 A1 * 2/2022 Dube .................... G06F 21/335
2022/0070279 A1 * 3/2022 Pang ..................... H04L 67/133
2022/0103559 A1 3/2022 Weisshaar et al.
2022/0116445 A1 * 4/2022 Filippou ............. H04L 41/0853
2022/0329445 A1 * 10/2022 Farrahi Moghaddam ................... H04L 9/30
2022/0329573 A1 * 10/2022 Sood ..................... H04L 63/166
2022/0417252 A1 * 12/2022 Moon ................. H04L 63/0846
2022/0417264 A1 * 12/2022 Moon ................... H04L 63/104

SYSTEMS, METHODS, AND DEVICES FOR SECURITY ENHANCEMENTS IN CLOUD COMPUTING ENVIRONMENTS

FIELD OF TECHNOLOGY

This patent document relates generally to computing platforms and more specifically to security and verification techniques for cloud-based computing platforms.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks. Cloud computing environments may include applications implemented using multiple services and microservices. Such services may send requests to each other as well as other entities coupled to or included in the cloud computing environment. In such a cloud computing environment, the number of requests sent between services as well as other entities may be numerous, and conventional cloud computing environments might not be able to ensure each request is secure.

BRIEF DESCRIPTION OF THE DRAWINGS

The included drawings are for illustrative purposes and serve only to provide examples of possible structures and operations for the disclosed inventive systems, apparatus, methods and computer program products for improved security of computing platforms. These drawings in no way limit any changes in form and detail that may be made by one skilled in the art without departing from the spirit and scope of the disclosed implementations.

DETAILED DESCRIPTION

Cloud-based applications may be implemented in a distributed manner, and may be deployed using multiple different services implemented in service meshes of cloud computing environments. With such service meshes, messages and requests may be sent between users, which may be attackers, and services or between services in different service meshes included in different computing platforms. Messages and requests may also be sent between services included in the same service mesh or in different service meshes included in the same computing platform. Accordingly, requests handled by services may traverse multiple different entities when traveling from source to destination.

Security entities, such as firewalls and intrusion detection systems, may be implemented to provide security for service meshes. However, such security entities often require communication with external services for each verification operation, and the verification operations themselves, such as those performed by a firewall, may be computationally intensive. Accordingly, use of such firewalls and intrusion detection systems is not feasible for each step of transmission/reception of each request. For these reasons, conventional security implementations remain limited because they are not able to provide security verification at all stages of handling a message or request used by a service in a service mesh.

Various implementations disclosed herein provide custom data objects that are configured as security headers embedded within requests and messages used by services in service meshes. As will be discussed in greater detail below, such security headers are configured to store a chain of trust data object used to store and track results of verification operations and signatures such that all such information is embedded within the header, and does not require additional communication with an external security entity, such as a firewall service. Accordingly, an overall number of requests sent to such security entities may be reduced, thus reducing overall processing overhead associated with the handling of a request. Moreover, security verification may be provided at each stage of the handling of such a request.

While sidecars, firewalls, and other entities, such as proxies, are discussed herein, it will be appreciated that each of these entities may be capable of performing the security header modification and verification operations disclosed herein. Accordingly, while an operation may be described below as being performed by a sidecar, it will be appreciated that another entity, such as a firewall or proxy, may also be configured to perform such an operation.

Figure 1:
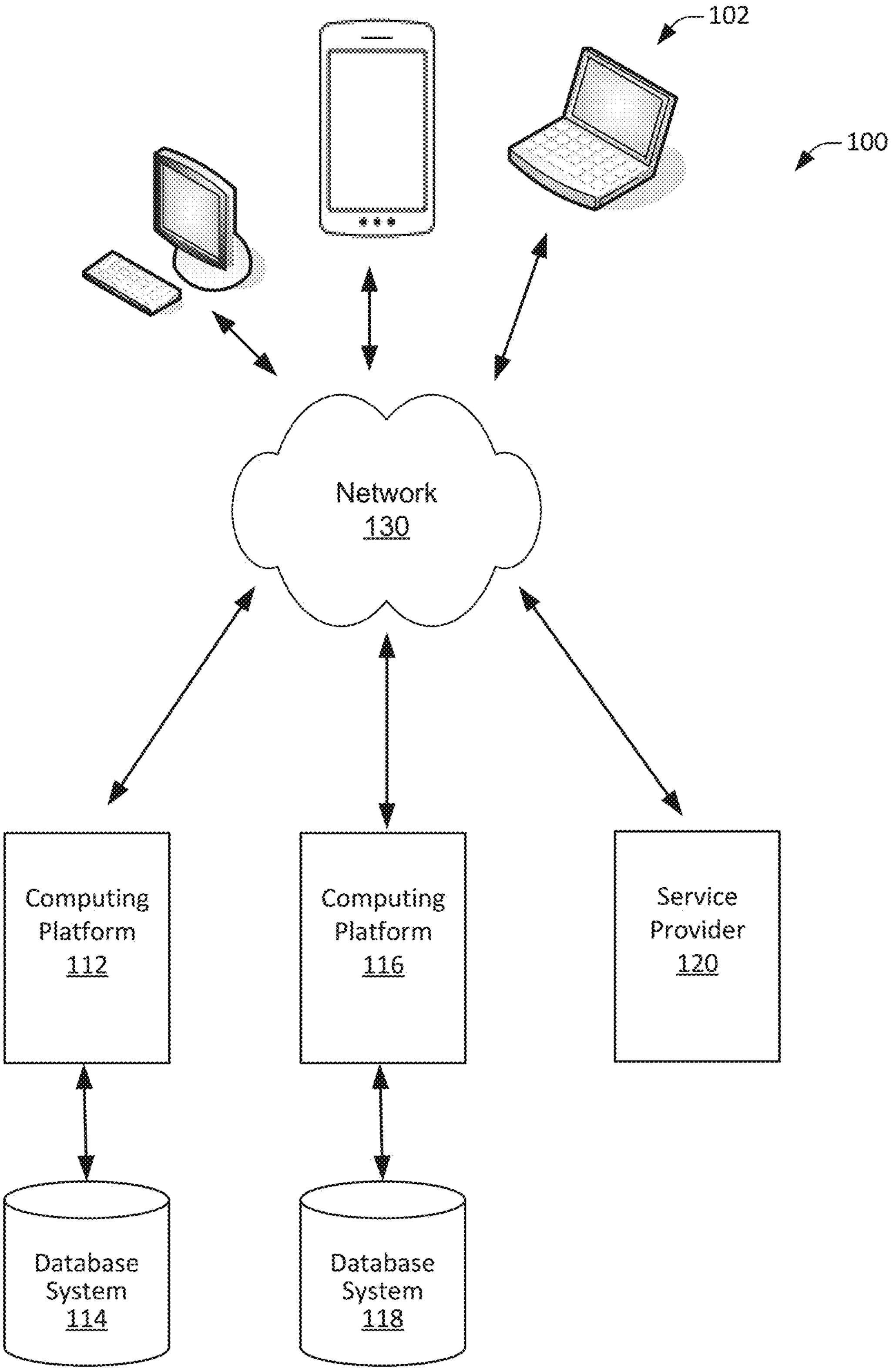
FIG. 1 illustrates an example of an arrangement of components in a cloud-based computing system, configured in accordance with one or more implementations.

FIG. 1 illustrates an example of an arrangement of components in a cloud-based computing system, configured in accordance with one or more implementations. As will be discussed in greater detail below, a system, such as system 100, may be implemented to utilize customized data objects included in requests passed between components of system 100 to enhance and improve overall security of system 100. More specifically, a security header may be embedded in application requests that allow security verification operations to be performed and tracked while reducing an overall computational and system overhead associated with such security verification operations.

Accordingly, system 100 includes one or more client machines, which may also be referred to herein as client devices, such as client machine 102. In various implementations, client machine 102 is a computing device accessible by a user. For example, client machine 102 may be a desktop computer, a laptop computer, a mobile computing device such as a smartphone, or any other suitable computing device. Accordingly, client machine 102 includes one or more input and display devices, and is communicatively coupled to communications network 130, such as the internet. In various implementations, client machine 102 comprises one or more processors configured to execute one or more applications that may utilize a user interface. Accordingly, a user may request and view various different display screens associated with such applications via client machine 102. In various implementations, a user interface may be used to present the display screen to the user, as well as receive one or more inputs from the user. In some implementations, the user interface may utilize a web browser executed on client machine 102 or may be a standalone locally executed application. Moreover, such user interfaces may be used to access on-demand services and software applications, as will be discussed in greater detail below.

In various implementations, system 100 further includes one or more servers configured to provide a computing platform, such as computing platform 112, and various client devices may be communicatively coupled to computing platform 112. In various implementations, computing platform 112 is configured to include software and hardware that provides an environment for the execution of an application. As will be discussed in greater detail below, computing platform 112 may include components configured to implement a service layer and a data layer associated with one or more hosted applications.

More specifically, computing platform 112 may include one or more processors and memory configured execute components of a software application. As will be discussed in greater detail below, computing platform 112 may implement the service layer as a service mesh that includes multiple application services and associated sidecars, as well as one or more gateways to facilitate communication. As will also be discussed in greater detail below, communication between such services, as well as other components of system 100, may be configured to use headers that are customized and configured to include security headers that include an embedded chain of trust that may be used for security and verification purposes. Additional details regarding the security header are discussed in greater detail below. In some implementations, computing platform 112 may also be configured to store program code and settings for a particular application, and may also be configured to execute the code.

Computing platform 112 may be in communication with numerous client devices and may implement the application in a distributed manner. In some implementations, computing platform 112 is further configured to generate and serve webpages that may be viewed by a user via one or more devices, such as client machine 102. Accordingly, computing platform 112 is configured to provide a web-based interface between a user of client machine 102 and an application that is deployed in a distributed environment. In some implementations, computing platform 112 is coupled to database system 114 which may be configured to store various application data and data associated with webpages served by computing platform 112, and thus may provide local storage for computing platform 112.

In some implementations, system 100 additionally includes computing platform 116 and its associated database system 118. Accordingly, system 100 may include multiple computing platforms having multiple service meshes that are in communication with each other. Moreover, system 100 may include service provider 120. In one example, service provider 120 is a third party service provider that provides a security verification service. Accordingly, service provider 120 may be a third party service vendor that provides security and verification operations, such as those that may be performed by a firewall.

Figure 2:
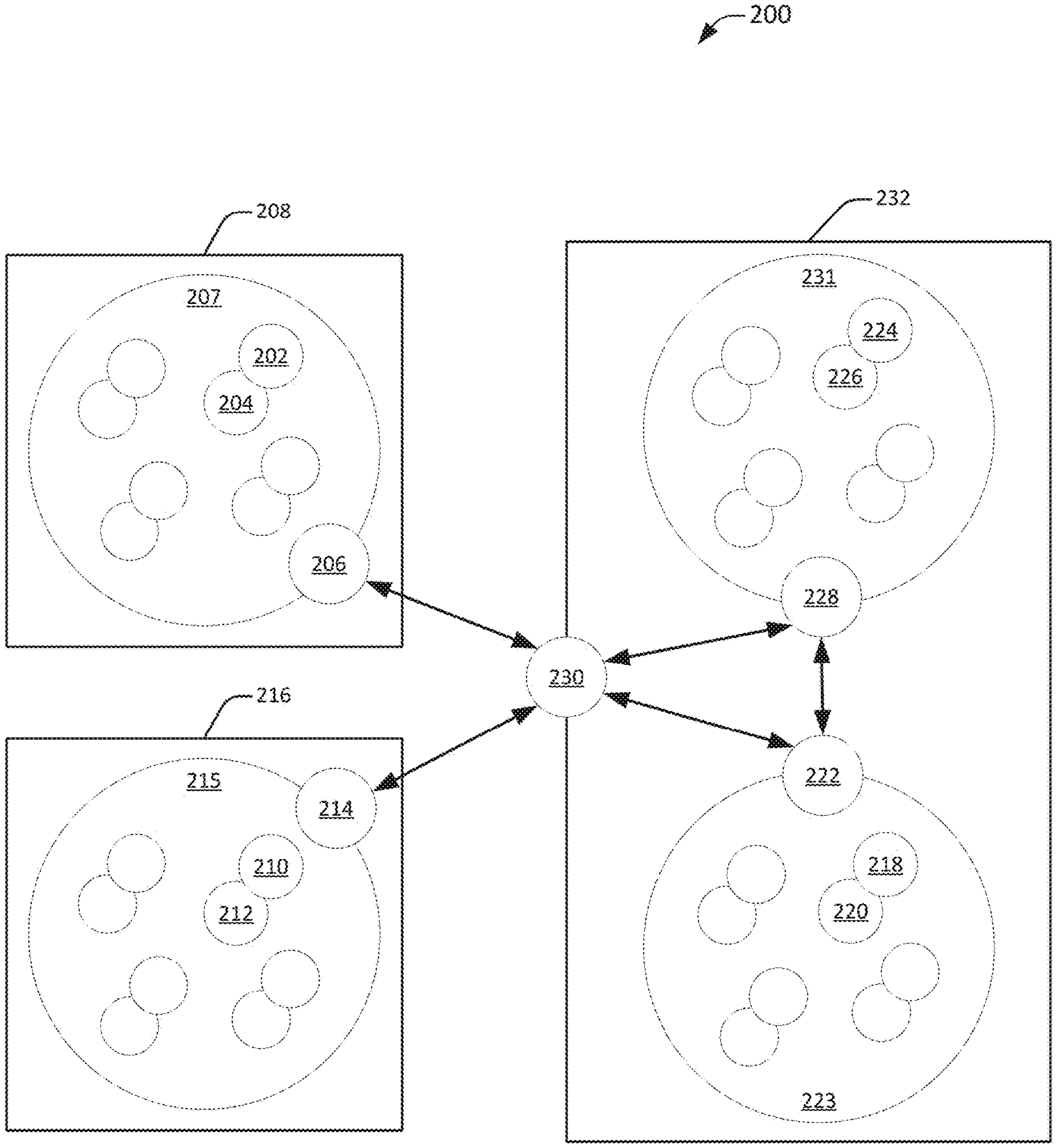
FIG. 2 illustrates an example of service meshes implemented in a cloud-based computing system, configured in accordance with one or more implementations.

FIG. 2 illustrates an example of service meshes implemented in a cloud-based computing system, configured in accordance with one or more implementations. As discussed above, a computing platform may be implemented using a service layer including several services configured to perform specific functions within an application hosted by the computing platform. As will be discussed in greater detail below, services may communicate with each other within a service mesh, and may also communicate with other services and entities in other service meshes and/or other computing environments.

As shown in FIG. 2, system 200 may include first computing platform 208 which includes first service mesh 207. Moreover, first service mesh 207 may include multiple services, such as service 202, and each service may have a sidecar, such as sidecar 204. As will be discussed in greater detail below, a service may be configured to perform a specific function within the context of a hosted application, and a sidecar may be configured to handle various communications operations for the service, such as sending and receiving messages and requests. As will be discussed in greater detail below, sidecars, such as sidecar 204, may be configured to send and receive messages and requests using customized security objects, such as a security header. Accordingly, sidecar 204 may be configured to analyze contents of a received request to determine if a security header is present, and may also determine which action should be taken based on such an analysis. Additional details regarding such determinations and actions are discussed in greater detail below with reference to FIGS. 3-5. In some implementations, first service mesh 207 also includes gateway 206 which is configured to handle communications between services within first service mesh 207 and other entities outside of first service mesh 207.

System 200 also includes second computing platform 216 which includes second service mesh 215. As similarly discussed above, second service mesh 215 may include multiple services, such as service 210, and each service may have a sidecar, such as sidecar 212. In some implementations, second service mesh 215 also includes gateway 214 which is configured to handle communications between services within second service mesh 215 and other entities outside of second service mesh 215.

System 200 further includes third computing platform 232 which includes third service mesh 223 and fourth service mesh 231. As similarly discussed above, third service mesh 223 and fourth service mesh 231 may each include multiple services, such as service 218 and service 224, and each service may have a sidecar, such as sidecar 220 and sidecar 226. As shown in FIG. 2, third service mesh 223 includes gateway 222, and fourth service mesh 231 includes gateway 228. Moreover, third computing platform 232 may also include gateway 230 which handles communication between gateway 222 and gateway 228, and other entities outside of third computing platform 232, such as those of first computing platform 208 and second computing platform 216.

Figure 3:
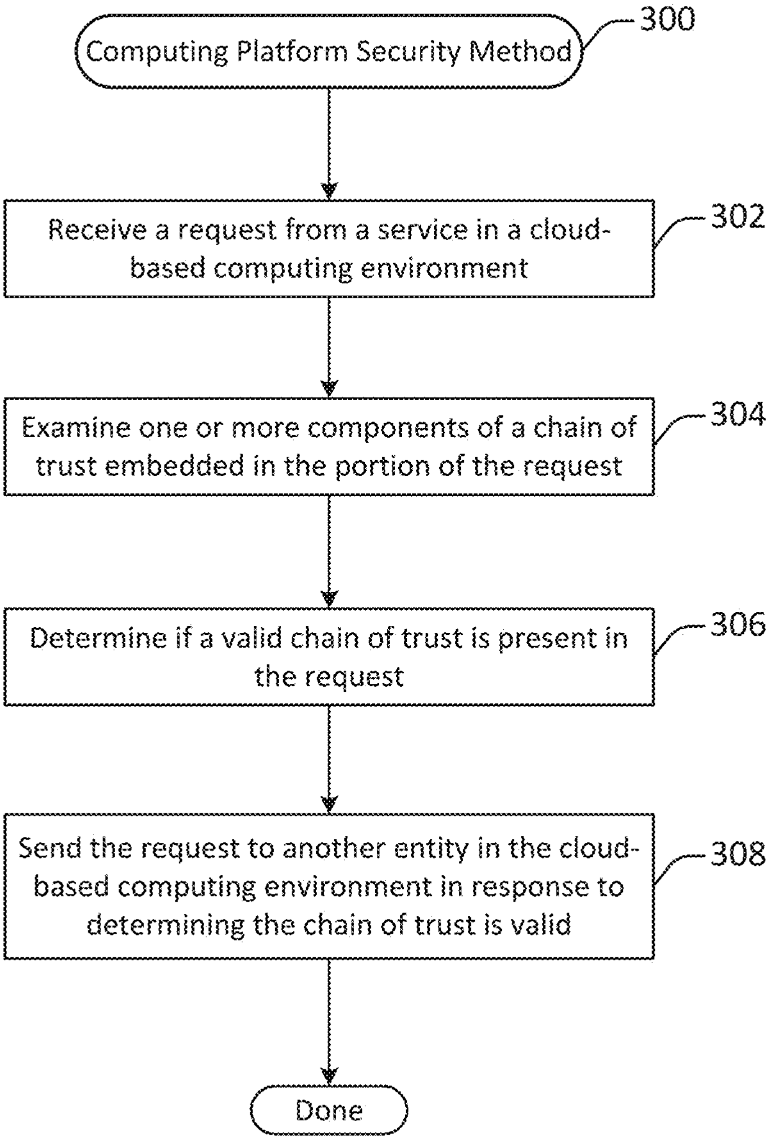
FIG. 3 illustrates an example of a method for computing system security, performed in accordance with one or more implementations.

FIG. 3 illustrates an example of a method for computing system security, performed in accordance with one or more implementations. As similarly discussed above, services within a service layer may use specifically configured data objects to manage security and verification operations for messages and requests sent to and from such services. As will be discussed in greater detail below, a chain of trust may be embedded within the data object to ensure that security and integrity of such messages and requests is maintained, and in a manner that reduces an overall number of verification operations.

Method 300 may perform operation 302 during which a request may be received from a service in a cloud-based computing environment. As discussed above, messages may be sent to and from services within a service mesh of a cloud computing platform. Accordingly, during operation 302, a request may be received at a sidecar associated with a service within a service mesh. The request may have been received from another service, or from another entity, such as a client machine.

Method 300 may perform operation 304 during which one or more components of a chain of trust embedded in a portion of the request may be examined. Accordingly, the sidecar may examine a header of the request to determine if a security header is present. Such a security header may be identified based on one or more designated identifiers, which may have been previously determined by an entity such as an administrator. For example, a request may have a particular form, as may be the case with an HTTP request, and the request may be parsed such that all fields of the header are parsed and inspected. Accordingly, the security header, also referred to herein as a trust header, may be inspected by the sidecar. As will be discussed in greater detail below, a public key may be retrieved from a domain identified in the security header by a DNS query. In some implementations, this is performed responsive to determining that the domain is a trusted domain as determined by a security policy. A signature included in the security header may be verified using the public key. Moreover, the rest of information in the security header, such as a status field, may also be processed to check for the presence of malicious entities, such as an SQL injection. As will be discussed in greater detail below, the sidecar may examine the security header to determine if a chain of trust is present.

Method 300 may perform operation 306 during which it may be determined if a valid chain of trust is present. In various implementations, the sidecar may make such a validity determination based on designated security policies, and may take an action in response to the determination of whether or not a valid chain of trust is present. In various implementations, the designated security policies may be stored as security logic or a rules engine, and such designated security policies may have been previously determined by an entity, such as an administrator. As will be discussed in greater detail below, such security policies may include one or more data values identifying conditions in which it is permissible to send a message, as well as conditions in which additional security operations should be taken. In some implementations, a security policy may be a list of trusted domains. Such a list may have been generated by an entity, such as Salesforce.com. For example, a security policy may list domains such as cp.com, cdn1.com and cdn2.com. In this example, such a security policy is used to manage DNS queries that may be made for public keys. Accordingly, in this example, the public/private key-based cryptographic operation is only performed for trusted domains.

Method 300 may perform operation 308 during which the request may be sent to another entity in the cloud-based computing environment in response to determining that the chain of trust is valid. Accordingly, if the sidecar determines that the chain of trust included in the security header is valid, the sidecar may forward the request to its target destination which may be its associated service, or may be another entity such as another service or gateway.

Figure 4:
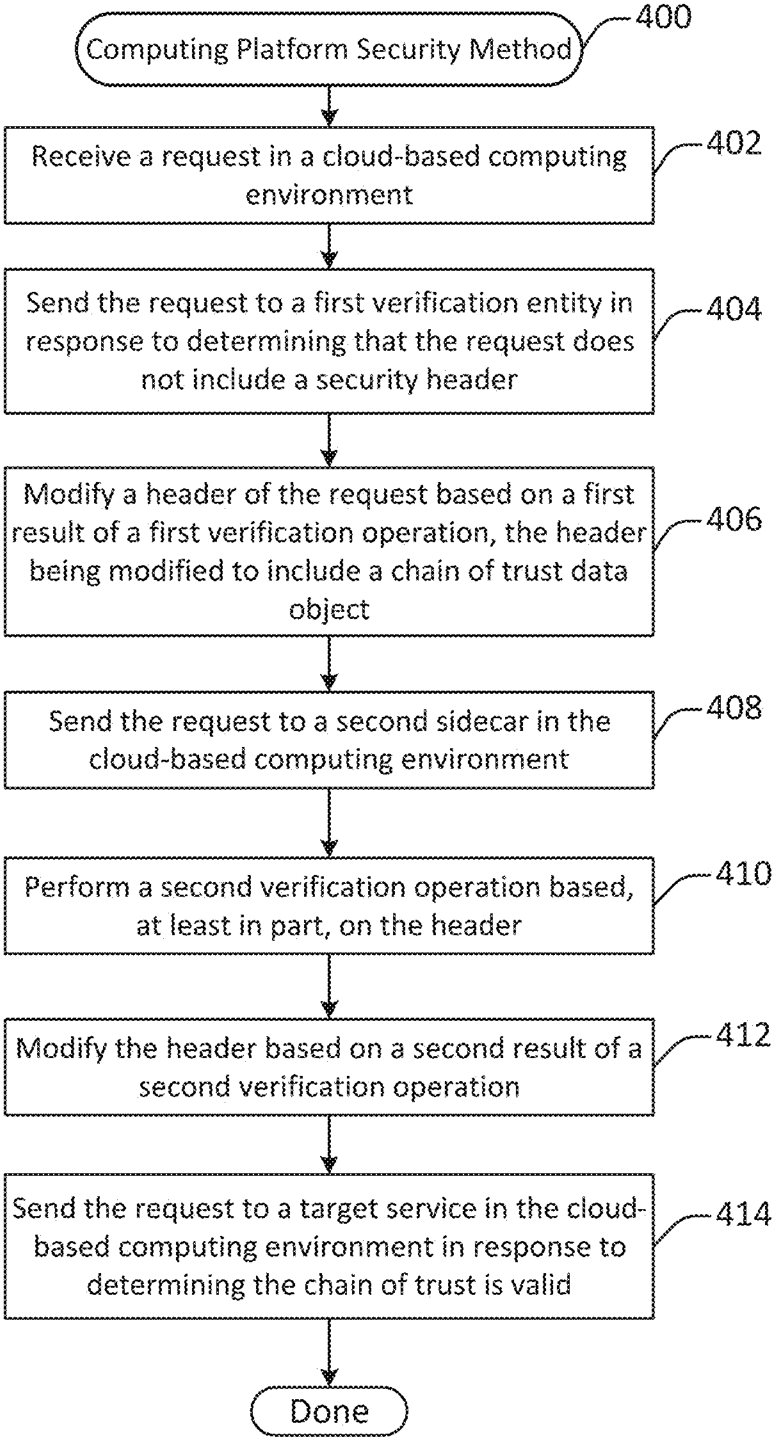
FIG. 4 illustrates an example of a method for computing system security, performed in accordance with one or more implementations.

FIG. 4 illustrates an example of a method for computing system security, performed in accordance with one or more implementations. As similarly discussed above, services within a service layer may use specifically configured data objects to manage security and verification operations for messages and requests sent to and from such services. As will be discussed in greater detail below, a chain of trust may be embedded within the data object to ensure that security and integrity of such messages and requests is maintained, and in a manner that reduces an overall number of verification operations. More specifically, security policies, also referred to herein as policies, may be applied to a security header to determine if such verification operations are needed.

Method 400 may perform operation 402 during which a request may be received in a cloud-based computing environment. As discussed above, messages may be sent to and from services within a service mesh of a cloud computing platform. Accordingly, during operation 402, a request may be received at a first sidecar associated with a service within a service mesh. As similarly discussed above, the first sidecar may be communicatively coupled to other services in service meshes, as well as other entities outside of the computing platform. Accordingly, the request may have been received from another service, or from another entity, such as a client machine or a third party.

Method 400 may perform operation 404 during which the request may be sent to a first verification entity in response to determining that the request does not include a security header. Accordingly, as similarly discussed above, the first sidecar that receives the request may examine a header of the request to see if a security header is present. More specifically, the first sidecar may examine the header to determine if a data object including a chain of trust data object is present. As also discussed above, such a determination may be made based on the presence of one or more designated identifiers as may be set by one or more security policies. Accordingly, if a security header is present, the first sidecar may forward the request to a downstream entity. However, if no security header is present, the first sidecar may send the request to the first verification entity.

Method 400 may perform operation 406 during which a header of the request may be modified based on a first result of a first verification operation. In some implementations, the first verification entity may be a third party security vendor that provides a firewall. Accordingly, a request that does not include any security header may be forwarded to a firewall to be analyzed. The firewall may scan the header and payload of the request to see if any threats are detected in accordance with security policies stored and maintained by the third party service provider. Such threats may include layer 7 attacks, SQL injections, XSS attacks, and/or viruses.

The firewall may then embed the result of the verification operation in the header of the request as a security header, and as part of a chain of trust data object. As will be discussed in greater detail below, the security header may be identified as a trust header.

In some implementations, the first sidecar also modifies the security header with its own verification signature. Accordingly, the first sidecar may include its signature, which may be a private key. In some implementations, the signature may be applied to the result of the verification operation provided by the firewall. In this way, the first sidecar may sign the verification operation provided by the firewall, and the signed verification result may be included in the chain of trust stored in the security header. In one example, if the request includes a valid JWT token, the first sidecar may sign the JWT token. If no JWT token is present, the first sidecar may sign the data payload.

Method 400 may perform operation 408 during which the request may be sent to a second sidecar. Accordingly, once the header has been modified by the first verification entity and the first sidecar, the first sidecar may then send the request to an appropriate downstream entity, such as a second sidecar or a gateway. In some implementations, the appropriate downstream entity may be identified by one or more data values included in the request, or based on other network topology data that may be stored and managed within a service mesh.

Method 400 may perform operation 410 during which a second verification operation may be performed. Accordingly, the request may be received at the second sidecar which may also examine the request to see if a security header is present. In various implementations, in response to determining that a security header is present, the second sidecar may perform the second verification operation. In one example, the second verification operation may include a DNS lookup performed by the second sidecar. Accordingly, during operation 410, the second sidecar may verify a domain of the security header by comparing the domain of the security header against a list of trusted domains identified by a security policy. For example, the signature included in the security header may include the domain of the first sidecar. During operation 410, the second sidecar may perform a DNS lookup of the domain of the first sidecar to verify that the domain of the first sidecar is a trusted domain. In some implementations, the DNS lookup may be performed using a local DNS cache to reduce a number of server calls and/or queries.

In response to identifying the domain as a trusted domain, the second sidecar may use a DNS query to retrieve a public key from the domain, and the public key may be used to verify the signature included in the security header. In this way, the second sidecar may verify that the domain of the security header is a trusted domain, and that the signature included in the security header is valid for that domain. In some implementations, trusted domains may be identified based on a designated list of trusted domains that may have been determined by an entity, such as an on-demand service provider. Accordingly, the on-demand service provider may have previously generated a list based on observed traffic to the sidecar and known domains its associated service interacts with to execute an application. For example, the domain sf.com may accept trusted headers from cp.com, cdn1.com, cdn2.com and otherpartner.com.

Method 400 may perform operation 412 during which the header of the request may be modified based on a second verification operation. In various implementations, the second sidecar may also sign the security header using its own private key. In this way, the security header may be modified, and the chain of trust may be updated to include the signature of the second sidecar as well.

Method 400 may perform operation 414 during which the request may be sent to a target service in the cloud-based computing environment. Accordingly, the request may be forwarded to a target entity, which may be a target service within a service mesh. The request may be received at a target sidecar associated with that target service. The target sidecar may examine the security header, and may pass the request along to the target service in response to determining the chain of trust included in the security header is valid. In this way, the target sidecar does not have to perform any additional verification operations or sending/receiving messages for verification operations, and security is ensured at each stage of the processing of the request.

Figure 5:
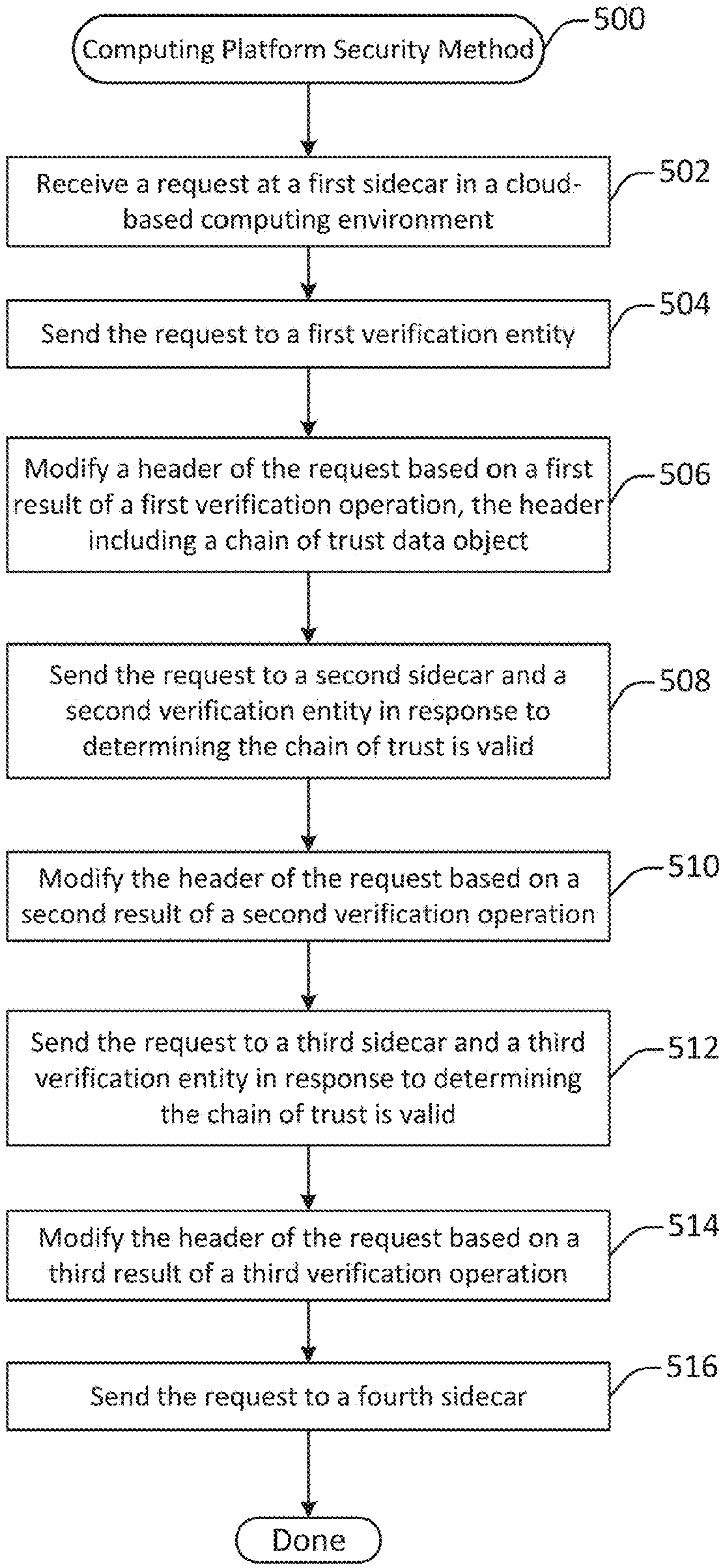
FIG. 5 illustrates an example of a method for computing system security, performed in accordance with one or more implementations.

FIG. 5 illustrates an example of a method for computing system security, performed in accordance with one or more implementations. As similarly discussed above, services within a service layer may use specifically configured data objects to manage security and verification operations for messages and requests sent to and from such services. As will be discussed in greater detail below, a chain of trust may be used to store verification results from multiple entities within a single chain of trust in a security header. Moreover, multiple different firewalls and different types of verification operations may be stored in a single chain of trust.

Method 500 may perform operation 502 during which a request may be received in a cloud-based computing environment. As discussed above, a request may be received at a first sidecar associated with a service within a service mesh. As also discussed above, the first sidecar may be communicatively coupled to other services in service meshes, as well as other entities outside of the computing platform. Accordingly, the request may have been received from another service, or from another entity, such as a client machine or a third party.

Method 500 may perform operation 504 during which the request may be sent to a first verification entity in response to determining that the request does not include a security header. Accordingly, as similarly discussed above, the first sidecar that receives the request may examine a header of the request to see if a security header is present. More specifically, the first sidecar may examine the header to determine if a data object, such as a security header, including a chain of trust data object is present. As also discussed above, such a determination may be made based on the presence of one or more designated identifiers as may be set by one or more security policies. Accordingly, if a security header is present, the first sidecar may forward the request to a downstream entity. However, if no security header is present, the first sidecar may send the request to the first verification entity.

Method 500 may perform operation 506 during which a header of the request may be modified based on a first result of a first verification operation. As similarly discussed above, the first verification entity may be a third party security vendor that provides a firewall. In one example, the first verification entity may be a firewall used by a content data network used to deliver content for the computing platform. Accordingly, as the request traverses the content data network infrastructure and arrives at a sidecar within a service mesh, it may be analyzed, and if it does not include any security header it may be forwarded to the content data network firewall. The firewall may scan the header and payload of the request to see if any threats are detected in accordance with security policies stored and maintained by the third party service provider. The firewall may then embed the result of the verification operation in the header of the request as a security header, and as part of a chain of trust data object. As similarly discussed above, the first sidecar may also modify the security header with a first verification signature, which may use a private key.

Method 500 may perform operation 508 during which the request may be sent to a second sidecar and a second verification entity. In one example, the second verification entity may be a perimeter firewall for a particular domain. Accordingly, the request may traverse from the content data network associated with a computing platform to a service mesh included in that computing platform, such as one provided by Salesforce.com®, and may be received by a perimeter firewall of the computing platform.

Method 500 may perform operation 510 during which the header of the request may be modified based on a second result of a second verification operation. As similarly discussed above, the perimeter firewall may scan the header and payload of the request to see if any threats are detected in accordance with security policies stored and maintained by an on-demand service provider, such as Salesforce.com®. The perimeter firewall may then embed the second result of the second verification operation in the security header as part of the chain of trust data object. As similarly discussed above, the second sidecar may be configured to perform a DNS lookup to verify the domain of the first verification signature, and may also modify the security header with a second verification signature, which may also use a private key.

Method 500 may perform operation 512 during which the request may be sent to a third sidecar and a third verification entity. In one example, the third verification entity may be a firewall for another domain. Accordingly, the request may be sent to a host domain used to host a particular application, and may be received by a firewall of that domain.

Method 500 may perform operation 514 during which the header of the request may be modified based on a third result of a third verification operation. As similarly discussed above, the firewall may scan the header and payload of the request to see if any threats are detected in accordance with security policies stored and maintained by an entity, such as an administrator, associated with the host domain. The firewall may then embed the third result of the third verification operation in the security header as part of the chain of trust data object. As similarly discussed above, the third sidecar may be configured to perform a DNS lookup to verify the domain of the second verification signature, and may also modify the security header with a third verification signature, which may also use a private key.

Method 500 may perform operation 516 during which the request may be sent to a fourth sidecar. Accordingly, the fourth sidecar may be a target sidecar in the host domain. The fourth sidecar may perform a fourth verification operation, such as a DNS lookup, for the domain of the third verification signature. The fourth sidecar may perform one or more operations based on a result of the fourth verification operation. For example, if the domain is determined to be safe, the request may be sent to a target service within the host domain. It will be appreciated that the target service does not have to perform any additional security operations, and security of the request has been ensured across the entire communications path, and is documented in the chain of trust.

Figure 6A:
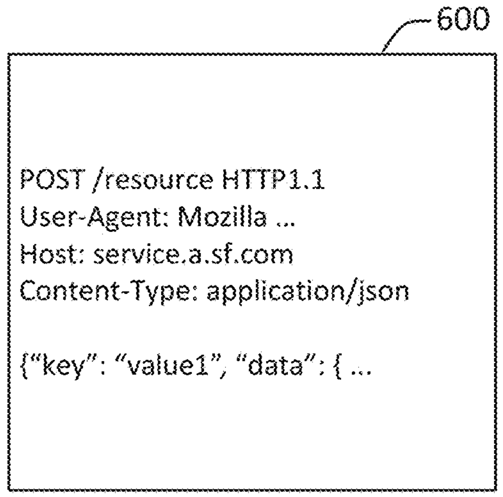
FIG. 6A illustrates a diagram of an example of a portion of a request used by components within a computing system, configured in accordance with one or more implementations.

FIG. 6A illustrates a diagram of an example of a portion of a request used by components within a computing system, configured in accordance with one or more implementations. Accordingly, image 600 illustrates an example of a header of a request that may be sent and received within a computing system disclosed herein. In various implementations, the header does not include a security header.

Figure 6B:
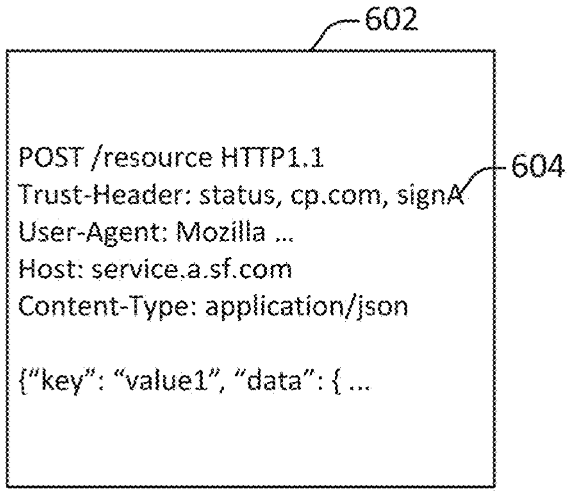
FIG. 6B illustrates a diagram of an example of a portion of a request used by components within a computing system, configured in accordance with one or more implementations.

FIG. 6B illustrates a diagram of an example of a portion of a request used by components within a computing system, configured in accordance with one or more implementations. Accordingly, image 602 illustrates an example of a header of a request that may be sent and received within a computing system disclosed herein. In various implementations, the header has been modified to include a security header, such as security header 604. More specifically, security header 604 includes an identifier that is configured to identify itself as a security header, and further includes data values representing a status, which may be used to identify safe/not safe or other security identifier. The data values may additionally identify a domain as well as a signature value. In the example shown in security header 604, the security header has been signed by an entity "A", which may be a sidecar.

Figure 6C:
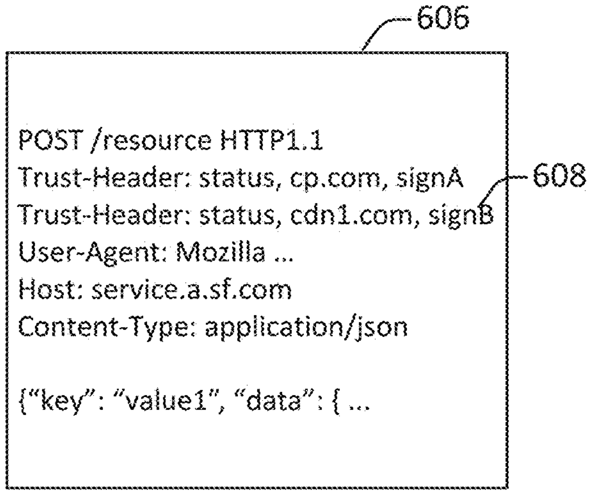
FIG. 6C illustrates a diagram of an example of a portion of a request used by components within a computing system, configured in accordance with one or more implementations.

FIG. 6C illustrates a diagram of an example of a portion of a request used by components within a computing system, configured in accordance with one or more implementations. Accordingly, image 606 illustrates an example of a header of a request that has been modified to include additional data values within the security header, such as data values 608. More specifically, data values 608 identify the presence of an additional security header entry, and further representing a status, domain, and signature. In the example shown in data values 608, the security header has been signed by an entity "B", which may be another sidecar.

Figure 6D:
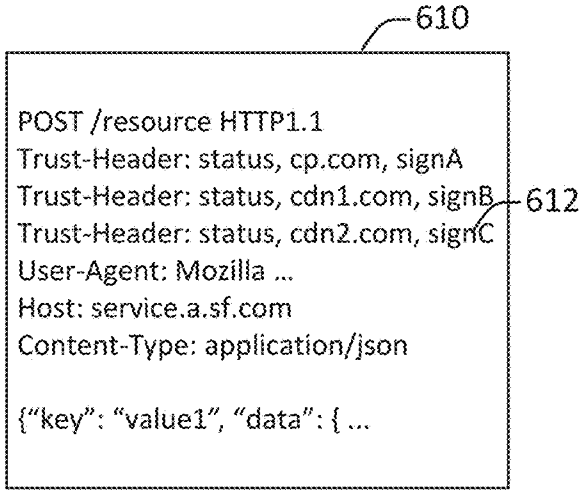
FIG. 6D illustrates a diagram of an example of a portion of a request used by components within a computing system, configured in accordance with one or more implementations.

FIG. 6D illustrates a diagram of an example of a portion of a request used by components within a computing system, configured in accordance with one or more implementations. Accordingly, image 610 illustrates an example of a header of a request that has been modified to include additional data values within the security header, such as data values 612. More specifically, data values 612 identify the presence of an additional security header entry, and further representing a status, domain, and signature. In the example shown in data values 612, the security header has been signed by an entity "C", which may be another sidecar. In this way, data values stored within the security header of a request may be iteratively modified to generate a chain of trust that represents verification operations performed along the journey of a request as it traverses a network topology to arrive at a target service within a service mesh.

Figure 7:
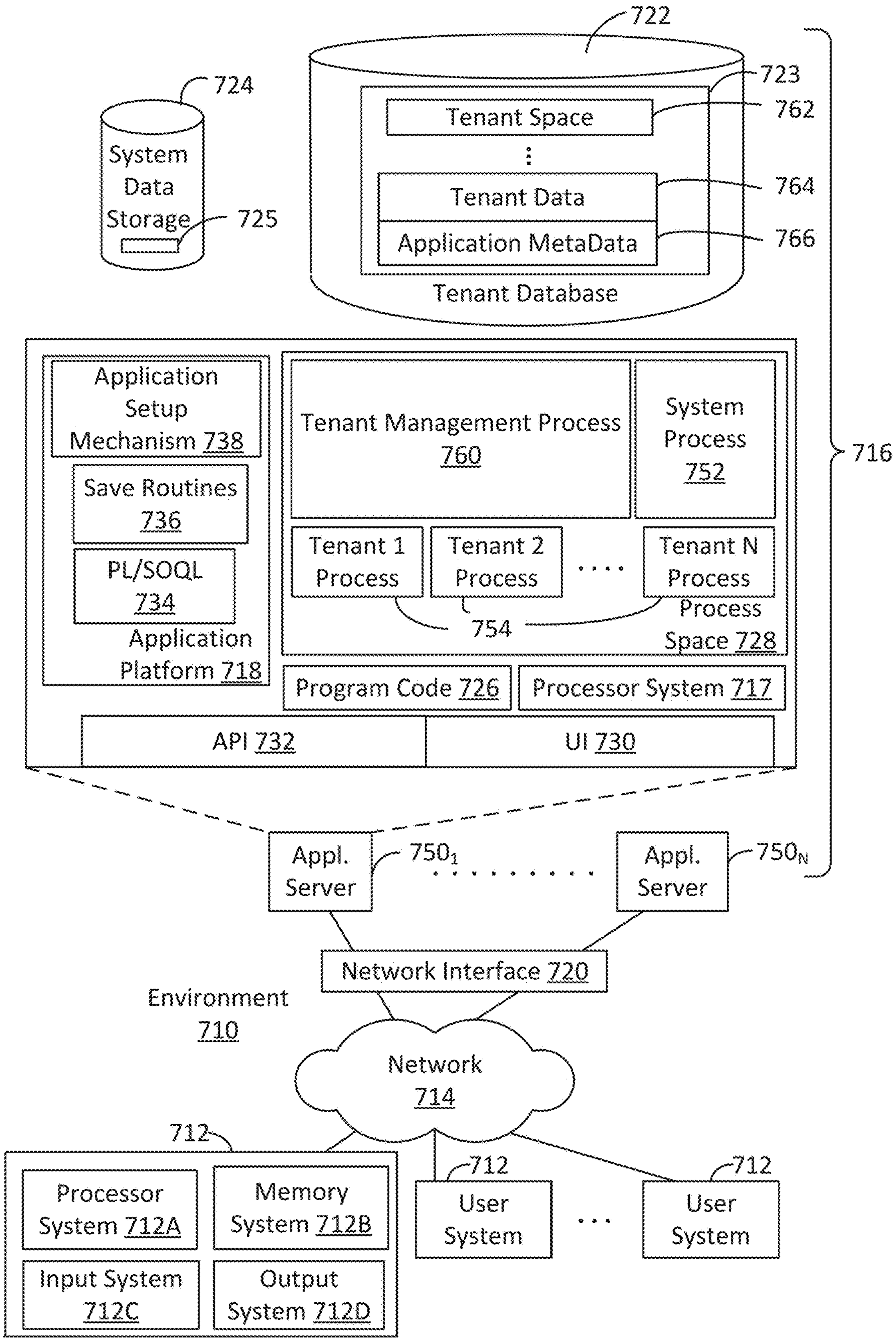
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 718 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based computing system. For example, in some implementations, system 716 may include application servers configured to implement and execute distributed cloud-based software applications using security headers disclosed herein. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as a computing platform having an associated service layer and service mesh, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
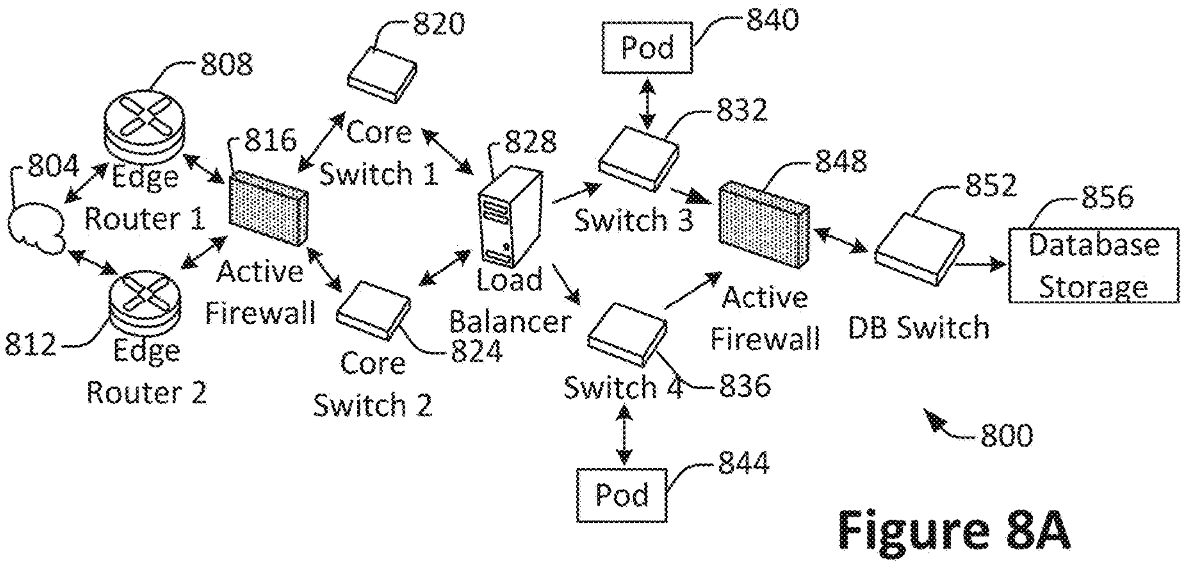
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems 712 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process distributed application information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
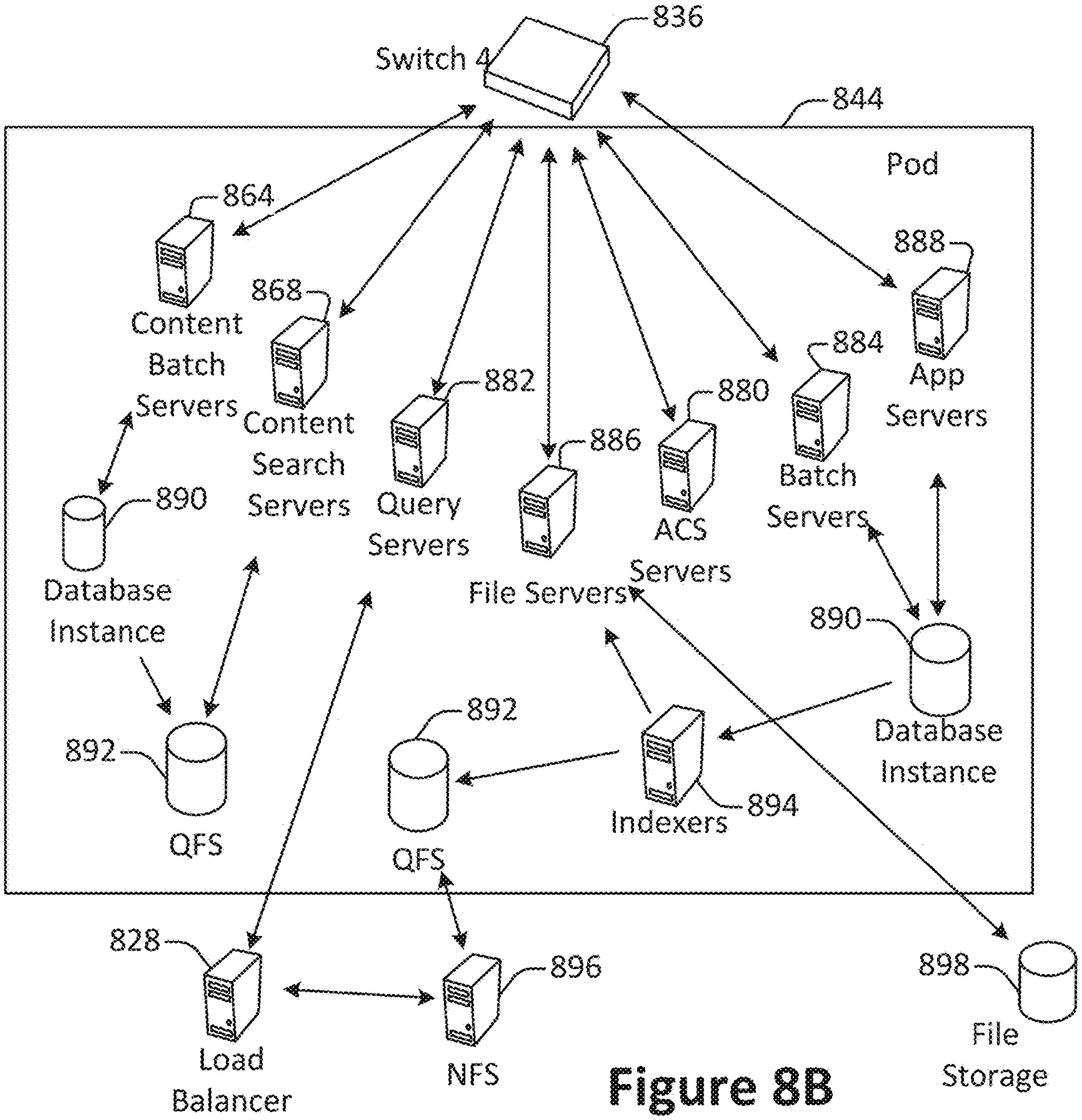
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
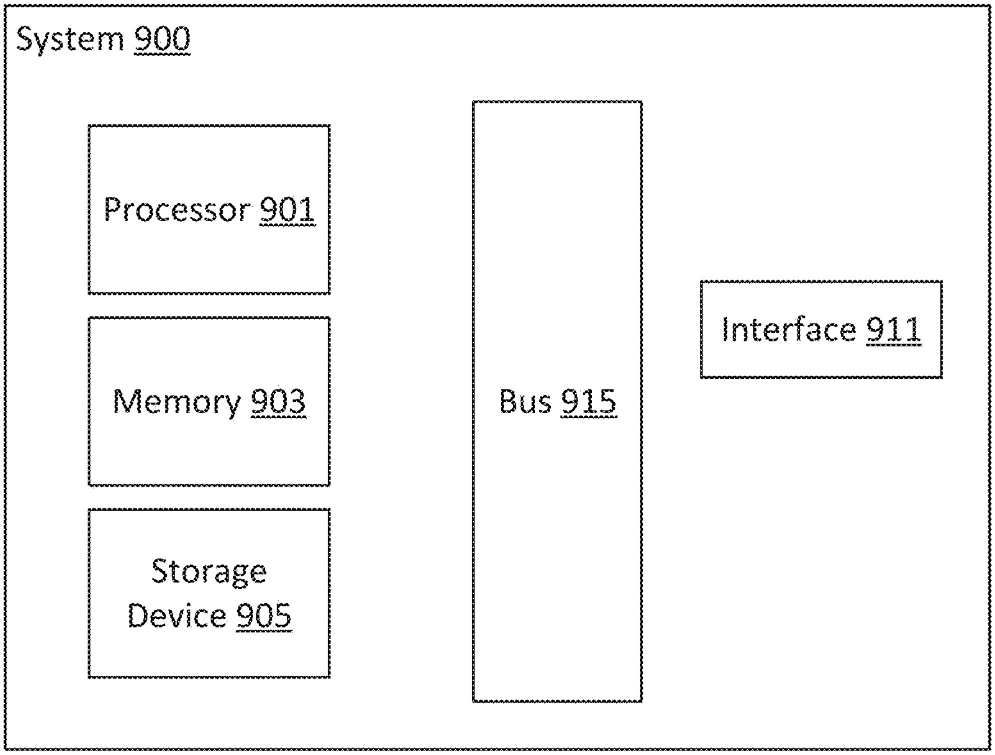
FIG. 9 illustrates one example of a computing device.

FIG. 9 illustrates one example of a computing device. According to various implementations, a system 900 suitable for implementing implementations described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some implementations include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific implementations including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular implementations may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A computing platform implemented using a server system comprising one or more processors, the one or more processors being configurable to cause:

receiving a request from a service in a cloud-based computing environment comprising a first service mesh comprising a plurality of services and a plurality of sidecars configured to perform communications operations for associated services;

identifying a chain of trust data object embedded in a custom security header of the request generated by the service, the request being configured to include a custom data field storing the security header, the chain of trust data object being generated by one or more security entities in the cloud-based computing environment, the one or more security entities comprising one or more external firewall services provided by a service provider, the chain of trust data object being configured to store results of a sequence of one or more security verification operations performed on the request as it traverses the first service mesh such that the chain of trust data object tracks at least some of the one or more security verification operations performed by the external firewall service as the request traverses the first service mesh, and such that the chain of trust data object includes a first signature from a first service and further includes a second result from a second firewall service and a second signature from a second service;

determining if the chain of trust data object embedded in the custom security header is a valid chain of trust based, at least in part, on one or more security policies; and sending, using a sidecar associated with the service, the request to another entity in the cloud-based computing environment identified based on the request and in response to determining the chain of trust data object is a valid chain of trust.

2. The computing platform of claim 1, wherein the chain of trust data object comprises a first result from a first firewall service.

3. The computing platform of claim 1, wherein the one or more security policies comprise a plurality of conditions configured to identify when the request may be sent.

4. The computing platform of claim 1 further comprising:

performing a domain name service (DNS) lookup based on one or more data values included in the chain of trust data object.

5. The computing platform of claim 4, wherein the DNS lookup is performed on a domain of the service from which the request is received.

6. The computing platform of claim 5, wherein the DNS lookup is performed using a local cache included in a service mesh.

7. A method comprising:

receiving a request from a service in a cloud-based computing environment comprising a first service mesh comprising a plurality of services and a plurality of sidecars configured to perform communications operations for associated services;

identifying a chain of trust data object embedded in a custom security header of the request generated by the service, the request being configured to include a custom data field storing the security header, the chain of trust data object being generated by one or more security entities in the cloud-based computing environment, the one or more security entities comprising one or more external firewall services provided by a service provider, the chain of trust data object being configured to store results of a sequence of one or more security verification operations performed on the request as it traverses the first service mesh such that the chain of trust data object tracks at least some of the one or more security verification operations performed by the external firewall service as the request traverses the first service mesh, and such that the chain of trust data object includes a first signature from a first service and further includes a second result from a second firewall service and a second signature from a second service;

determining if the chain of trust data object embedded in the custom security header is a valid chain of trust based, at least in part, on one or more security policies; and sending, using a sidecar associated with the service, the request to another entity in the cloud-based computing environment identified based on the request and in response to determining the chain of trust data object is a valid chain of trust.

8. The method of claim 7, wherein the chain of trust data object comprises a first result from a first firewall service.

9. The method of claim 7, wherein the one or more security policies comprise a plurality of conditions configured to identify when the request may be sent.

10. The method of claim 7 further comprising:

performing a domain name service (DNS) lookup based on one or more data values included in the chain of trust data object.

11. The method of claim 10, wherein the DNS lookup is performed on a domain of the service from which the request is received.

12. The method of claim 11, wherein the DNS lookup is performed using a local cache included in a service mesh.

13. A computer program product comprising non-transitory computer-readable program code capable of being executed by one or more processors when retrieved from a non-transitory computer-readable medium, the program code comprising instructions configurable to cause the one or more processors to perform a method comprising:

receiving a request from a service in a cloud-based computing environment comprising a first service mesh comprising a plurality of services and a plurality of sidecars configured to perform communications operations for associated services;

identifying a chain of trust data object embedded in a custom security header of the request generated by the service, the request being configured to include a custom data field storing the security header, the chain of trust data object being generated by one or more security entities in the cloud-based computing environment, the one or more security entities comprising one or more external firewall services provided by a service provider, the chain of trust data object being configured to store results of a sequence of one or more security verification operations performed on the request as it traverses the first service mesh such that the chain of trust data object tracks at least some of the one or more security verification operations performed by the external firewall service as the request traverses the first service mesh, and such that the chain of trust data object includes a first signature from a first service and further includes a second result from a second firewall service and a second signature from a second service;

determining if the chain of trust data object embedded in the custom security header is a valid chain of trust based, at least in part, on one or more security policies; and sending, using a sidecar associated with the service, the request to another entity in the cloud-based computing environment identified based on the request and in response to determining the chain of trust data object is a valid chain of trust.

14. The computer program product recited in claim 13, wherein the chain of trust data object comprises a first result from a first firewall service.

15. The computer program product recited in claim 13, wherein the method further comprises:

performing a domain name service (DNS) lookup based on one or more data values included in the chain of trust data object, wherein the DNS lookup is performed on a domain of the service from which the request is received.

* * * * *